United States Patent
Chen

(10) Patent No.: US 7,793,843 B2
(45) Date of Patent: Sep. 14, 2010

(54) IMAGE CAPTURE DEVICE WITH DATA INPUT FUNCTION AND DATA MANAGEMENT METHOD THEREOF

(75) Inventor: Zheng-Yong Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/332,357

(22) Filed: Dec. 11, 2008

(65) Prior Publication Data
US 2009/0302117 A1 Dec. 10, 2009

(30) Foreign Application Priority Data
Jun. 10, 2008 (CN) .................. 2008 1 0302082

(51) Int. Cl.
*G06K 7/10* (2006.01)
*G06K 15/00* (2006.01)

(52) U.S. Cl. .................. 235/462.45; 235/383; 235/454; 235/462.01; 235/472.01

(58) Field of Classification Search .................. 235/454, 235/462.01, 462.41, 462.43, 462.44, 462.45, 235/472.01, 383, 435, 439
See application file for complete search history.

(56) References Cited

U.S. PATENT DOCUMENTS

| 5,424,524 | A  | * | 6/1995  | Ruppert et al. ................. 705/8 |
| 7,063,263 | B2 | * | 6/2006  | Swartz et al. ........... 235/472.02 |
| 7,566,004 | B2 | * | 7/2009  | He et al. ..................... 235/385 |
| 7,594,609 | B2 | * | 9/2009  | Kotlarsky et al. ...... 235/462.42 |
| 2002/0065728 | A1 | * | 5/2002 | Ogasawara .................. 705/23 |
| 2005/0029358 | A1 | * | 2/2005 | Mankins ................ 235/462.46 |
| 2005/0198095 | A1 | * | 9/2005 | Du et al. ..................... 709/200 |
| 2006/0006238 | A1 | * | 1/2006 | Singh .................... 235/462.46 |

FOREIGN PATENT DOCUMENTS

CN        1841425 A       10/2006

* cited by examiner

*Primary Examiner*—Thien M. Le
*Assistant Examiner*—April A Taylor
(74) *Attorney, Agent, or Firm*—Zhigang Ma

(57) ABSTRACT

An image capture device with data input includes a storage unit, an image capture unit, a barcode recognition unit, a data indexing unit and a display unit. The storage unit stores barcode and other information associated with the barcode data. The image capture unit captures digital images of browsed goods. The barcode recognition unit recognizes barcodes in the captured images and reads the corresponding data. The data indexing unit determines whether the barcode data has a matching price in the prestored barcode data. The display unit displays match results.

4 Claims, 2 Drawing Sheets

IMAGE CAPTURE DEVICE WITH DATA INPUT FUNCTION AND DATA MANAGEMENT METHOD THEREOF

BACKGROUND

1. Technical Field

The disclosure relates to image capture devices and, particularly, to an image capture device with data input function and a data management method thereof.

2. Description of the Related Art

Generally, consumers prefer to compare prices and other details of goods when shopping. Much time and effort are often spent in noting and recording individual data for items browsed.

Therefore, it is desirable to provide an image capture device with data input function and a data management method thereof, which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the image capture device with data input function and data management method thereof. Moreover, in the drawings, like reference numerals designate corresponding parts throughout the several views.

DETAILED DESCRIPTION OF EMBODIMENTS

Embodiments of the image capture device and data management method thereof are described in detail here with reference to the drawings.

Figure 1:
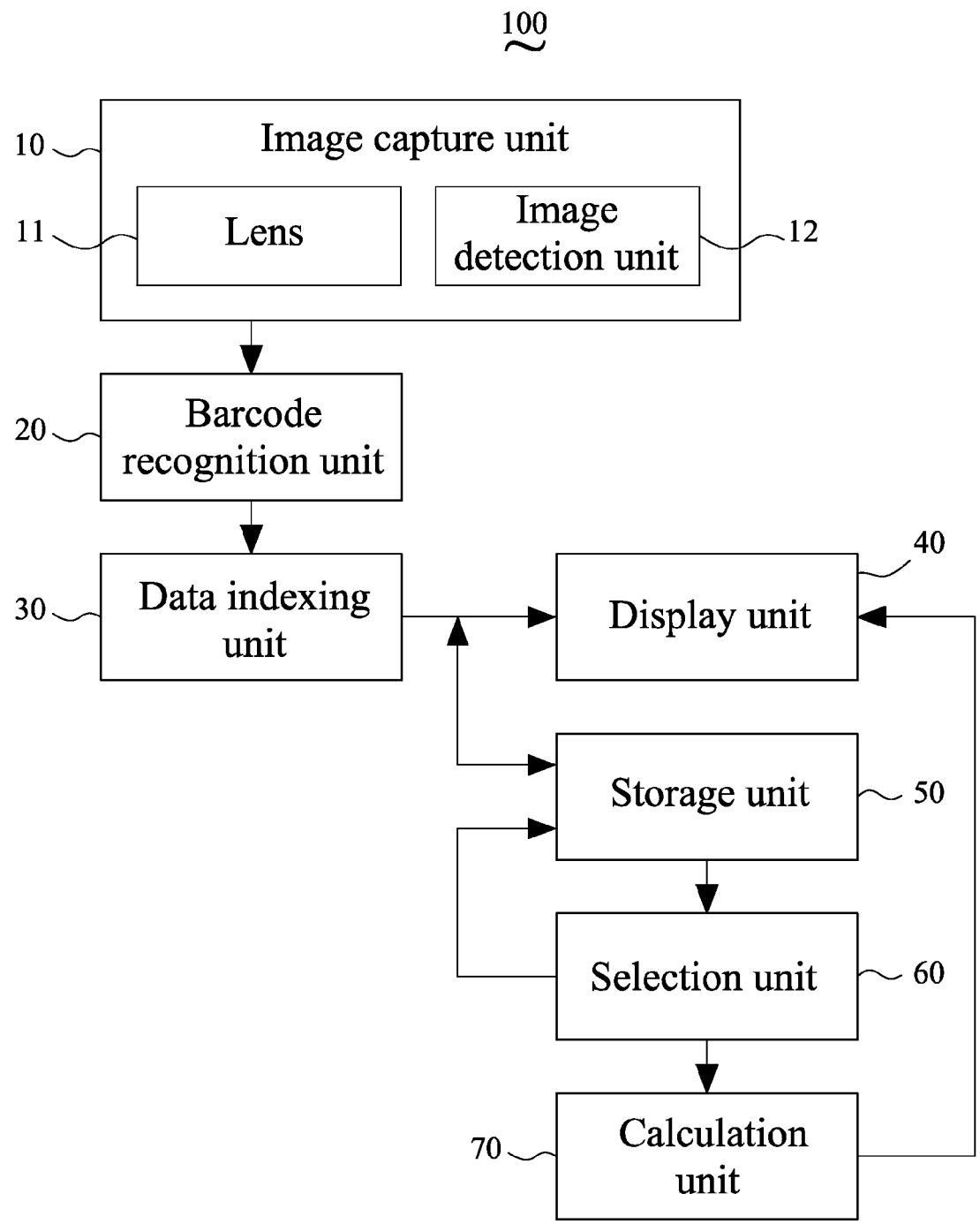
FIG. 1 is a block diagram of an image capture device, according to an embodiment of the disclosure.

As shown in FIG. 1, an image capture device 100 includes an image capture unit 10, a barcode recognition unit 20, a data indexing unit 30, a display unit 40, a storage unit 50, a selection unit 60, and a calculation unit 70. While here, the image capture device 100 is a digital still camera, alternatively, a mobile phone having a camera module or other portable device with image capture capability is equally applicable.

The storage unit 50 is configured for storing a collection of barcode data such as price, category, manufacturer, manufacture dates, and any other characteristics of information items. Each information term is associated with the corresponding barcode data. The data can be edited or set by retailers and stored in a public storage device (not shown). Consumers can download the data from the public storage device to the storage unit 50.

The image capture unit 10, configured for capturing digital images, includes a lens 11 and an image detection unit 12. The lens 11 is configured for optically capturing information for goods browsed, including the barcode attached thereto. The image detection unit 12, such as a Charge Coupled Device (CCD) or a Complementary Metal Oxide Semiconductor (CMOS), converts captured information into the corresponding digital signals.

The barcode recognition unit 20 reads and outputs corresponding barcode data.

The data indexing unit 30 indexes prices and other information for browsed goods. In detail, the data indexing unit 30 finds matches between the gathered barcode data with the prestored data. If matches are found, the corresponding barcode data is indexed and listed on the display unit 40 with the associated information term. However, if no match is found, a message such as "Database update needed" is displayed on the display unit 40.

The display unit 40, such as a liquid crystal display (LCD), displays information of browsed goods.

The selection unit 60 selects listed options related to the corresponding goods in response to user input. An exemplary listing displayed by the display unit 40 can be:

TABLE 1

| Title | Price | Manufacturer | Manufacture date |
| --- | --- | --- | --- |
| Towel A | 2.00 | aaa | xxxx-xx-xx |
| Towel B | 4.00 | bbb | yyyy-yy-yy |
| Toothbrush A | 1.50 | aaa | zzzz-zz-zz |

Consumers can compare options to determine which goods best meet their needs and select those options via, for example, a keypad of the image capture device 100 (not shown) or touch-screen function provided by the display unit 40.

The calculation unit 70 is configured for manipulating the index data for the selected options related to the corresponding goods. For example, if, in Table 1, options Towel B and Toothbrush A are selected, the calculation unit 70 can provide a total price for the items and outputs the total price on the display unit 40.

It should be noted that some components of the image capture device 100, such as barcode recognition unit 20, data indexing unit 30, selection unit 60, and calculation unit 70 can be individual electronic elements or integrated into a central controller. Alternatively, they can be implemented by software modules.

Figure 2:
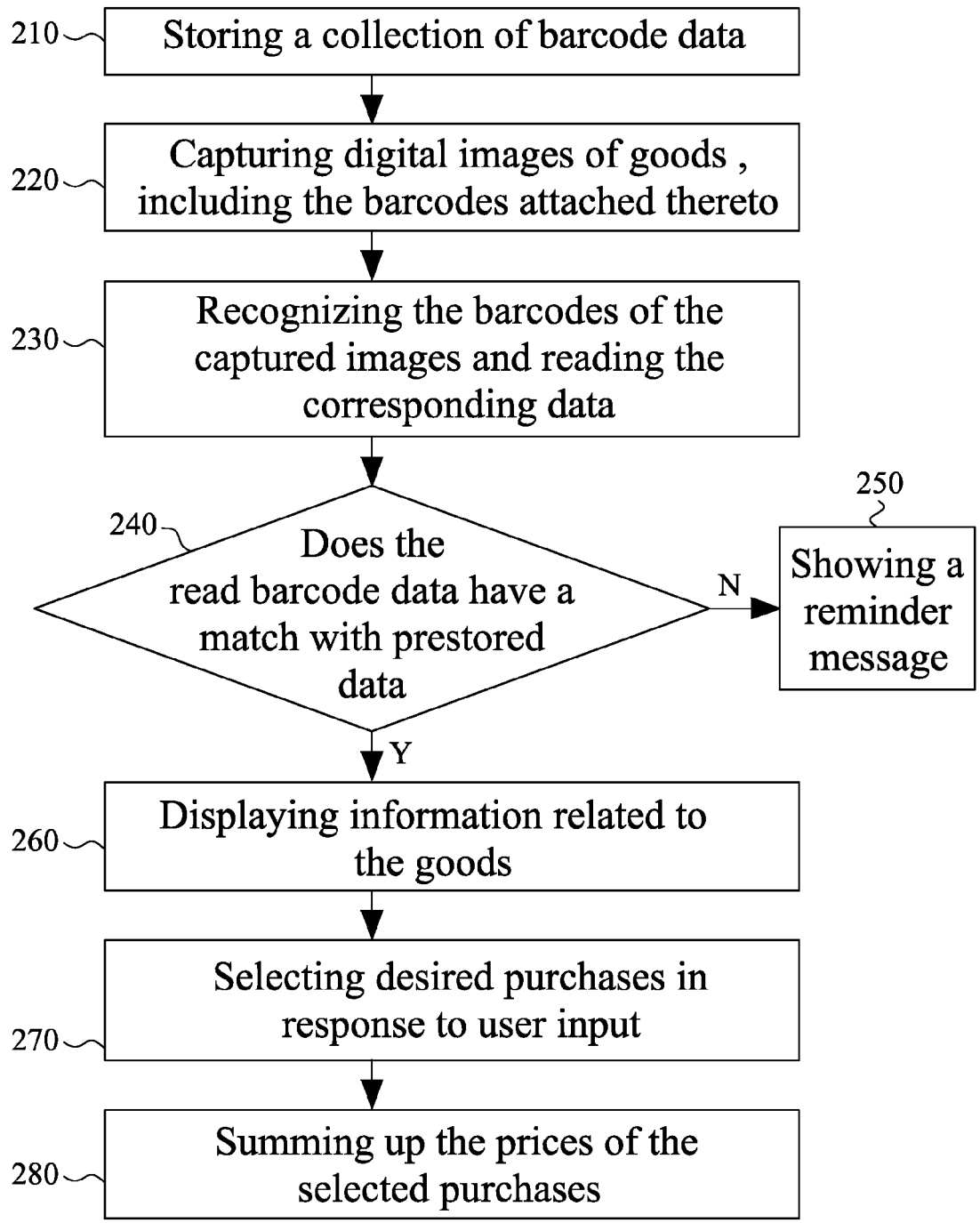
FIG. 2 is a flowchart of a data management method, according to an embodiment of the disclosure.

Referring to FIG. 2, a data management method for the image capture device 100 is shown.

In step 210, a collection of barcode data is stored in the storage unit 50. The collection can be edited by a retailer and uploaded to a public storage device from which shoppers can download the collection to the image capture device 100. In alternative embodiments, the data is directly stored in the storage unit 50 and the digital image capture device is provided by the retailer.

In step 220, digital images of browsed goods, including the barcode data, are captured using the image capture device.

In step 230, barcodes of the captured images are recognized and corresponding data read by the barcode recognition unit 20 and stored into the storage unit 50.

In step 240, matches between the read barcode data and the prestored data are sought by the data indexing unit 30. If matches are found, step 260 is implemented. If no match is found, step 250 is implemented. It should be noted that retailers may update the data regularly, such that no match is indexed if the shopper data has not been updated to synch with the most recent data collection.

In step 250, a message such as "Database update needed" is displayed.

In step 260, information pertaining to the browsed goods is displayed by the display unit 40.

In step 270, desired purchases are selected in response to user input by the selection unit 60.

In step 280, prices for selected purchases are totaled by the calculation unit 70.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data management method for an image capture device with data input function, comprising:

providing the image capture device with data input function to shoppers, the image capture device storing a collection of barcode data of goods, the barcode data of a good comprising at least the following information items: title, price, category, manufacturer, and manufacture date; the image capture device being configured for capturing digital images of browsed goods to which corresponding barcodes are attached, recognizing the barcodes in the captured images, determining whether the barcodes have matches in stored barcode data and displaying the information items corresponding to the matches of the barcode data; and updating the barcode data regularly.

2. The data management method of claim 1, wherein the image capture device is configured for displaying a message warning that update of the barcode data is needed if no match is found.

3. The data management method of claim 1, wherein the image capture device is configured for selecting listed options related to the corresponding browsed goods in response to user input.

4. The data management method of claim 3, wherein the image capture device is configured for totaling prices for the selected goods.

* * * * *